US010099115B2

United States Patent
Butler et al.

(10) Patent No.: US 10,099,115 B2
(45) Date of Patent: Oct. 16, 2018

(54) SYSTEM AND METHOD FOR USER CREATION OF DIGITAL OBJECTS

(71) Applicant: SONY INTERACTIVE ENTERTAINMENT AMERICA LLC, San Mateo, CA (US)

(72) Inventors: Jeffrey Butler, Poway, CA (US); Rosie Rappaport, San Diego, CA (US); Darrin McPherson, Oceanside, CA (US)

(73) Assignee: SONY INTERACTIVE ENTERTAINMENT AMERICA LLC, San Mateo, CA (US)

( * ) Notice: Subject to any disclaimer, the term of this patent is extended or adjusted under 35 U.S.C. 154(b) by 0 days.

(21) Appl. No.: 14/094,406

(22) Filed: Dec. 2, 2013

(65) Prior Publication Data

US 2014/0200084 A1     Jul. 17, 2014

Related U.S. Application Data

(60) Provisional application No. 61/734,290, filed on Dec. 6, 2012, provisional application No. 61/734,298, filed on Dec. 6, 2012.

(51) Int. Cl.
| | | |
|---|---|---|
| *A63F 13/00* | (2014.01) | |
| *A63F 13/63* | (2014.01) | |
| *A63F 13/792* | (2014.01) | |

(52) U.S. Cl.
CPC .............. *A63F 13/00* (2013.01); *A63F 13/63* (2014.09); *A63F 13/792* (2014.09); *A63F 2300/575* (2013.01)

(58) Field of Classification Search
CPC .......... A63F 13/00; A63F 13/63; A63F 13/792
See application file for complete search history.

(56) References Cited

U.S. PATENT DOCUMENTS

| | | | |
|---|---|---|---|
| 5,629,980 A | 5/1997 | Stefik et al. | |
| 6,195,646 B1 | 2/2001 | Grosh et al. | |
| (Continued) | | | |

FOREIGN PATENT DOCUMENTS

| | | |
|---|---|---|
| CN | 101444038 A | 5/2009 |
| EP | 1 296 241 | 3/2003 |

OTHER PUBLICATIONS

Rift Crafting and Gathering—Professions!—tgn.tv https://www.youtube.com/watch?v=tM9QYAuMnt4 Uploaded Feb 6, 2011 Posted by tgnRift.*

(Continued)

*Primary Examiner* — Tramar Harper
*Assistant Examiner* — Jeffrey Wong
(74) *Attorney, Agent, or Firm* — Polsinelli LLP

(57) ABSTRACT

Implementations of systems and methods according to present principles enhance and improve current methods of object creation. In such systems and methods, in addition to keeping track of a seller of an object (as seen, e.g., by an auction house notation), the identities and contributions are maintained of creators of component or subcomponent parts, or those who provided or crafted materials, either for a component or for the finished item, or those whose skills or talents contributed to the creation or obtaining of an item, component, subcomponent, or material, allowing subsequent benefits to such creators, including compensation or recognition.

27 Claims, 11 Drawing Sheets

(56) References Cited

U.S. PATENT DOCUMENTS

| | | |
|---|---|---|
| 7,133,846 B1 | 11/2006 | Ginter et al. |
| 7,703,673 B2 | 4/2010 | Buchheit et al. |
| 8,137,194 B1 | 3/2012 | Kelly et al. |
| 8,217,938 B2 | 7/2012 | Chen et al. |
| 8,244,595 B2 | 8/2012 | Giese et al. |
| 8,315,944 B2 | 11/2012 | Driemeyer et al. |
| 8,335,743 B2 | 12/2012 | Monteverde |
| 8,751,793 B2 | 6/2014 | Ginter et al. |
| 8,758,119 B1 | 6/2014 | Bronstein |
| 8,812,600 B1 | 8/2014 | McGuirk et al. |
| 8,986,123 B2 | 3/2015 | Satake et al. |
| 9,032,022 B1 | 5/2015 | Dunn et al. |
| 9,047,736 B2 | 6/2015 | Lempel et al. |
| 9,137,273 B2 | 9/2015 | Hoffman et al. |
| 9,345,974 B1 | 5/2016 | Santini et al. |
| 2002/0112163 A1 | 8/2002 | Ireton |
| 2005/0254371 A1 | 11/2005 | Wirtz et al. |
| 2006/0234795 A1 | 10/2006 | Dhunjishaw et al. |
| 2007/0033408 A1 | 2/2007 | Morten |
| 2007/0087799 A1 | 4/2007 | Van Luchene |
| 2007/0124216 A1 | 5/2007 | Lucas |
| 2007/0203841 A1 | 8/2007 | Maes |
| 2007/0208751 A1 | 9/2007 | Cowan et al. |
| 2008/0004093 A1 | 1/2008 | Van Luchene |
| 2008/0114836 A1 | 5/2008 | Zellner |
| 2008/0300933 A1 | 12/2008 | Britton et al. |
| 2009/0017886 A1 | 1/2009 | McGucken |
| 2009/0106847 A1 | 4/2009 | Krupman et al. |
| 2009/0157491 A1 | 6/2009 | Brougher et al. |
| 2009/0196465 A1 | 8/2009 | Menon |
| 2010/0005424 A1 | 1/2010 | Sundaresan et al. |
| 2010/0114664 A1 | 5/2010 | Jobin |
| 2010/0121729 A1 | 5/2010 | Betzler et al. |
| 2010/0299266 A1 | 11/2010 | Catania et al. |
| 2011/0119127 A1 | 5/2011 | Hangartner |
| 2011/0145137 A1 | 6/2011 | Driemeyer et al. |
| 2011/0191417 A1 | 8/2011 | Rathod |
| 2011/0212762 A1 | 9/2011 | Ocko et al. |
| 2012/0015715 A1 | 1/2012 | Luxton et al. |
| 2012/0084127 A1 | 4/2012 | Nkrumah |
| 2012/0124637 A1 | 5/2012 | Dunaway |
| 2012/0130853 A1 | 5/2012 | Petri et al. |
| 2013/0097047 A1 | 4/2013 | Kim |
| 2013/0166332 A1 | 6/2013 | Hammad |
| 2013/0179761 A1 | 7/2013 | Cho et al. |
| 2014/0024457 A1* | 1/2014 | Justice .......... A63F 13/12 463/42 |
| 2014/0025473 A1 | 1/2014 | Cohen |
| 2014/0164227 A1 | 6/2014 | Butler |
| 2014/0329585 A1 | 11/2014 | Santini et al. |
| 2015/0262152 A1 | 9/2015 | Muller et al. |

OTHER PUBLICATIONS

Mark Overmars, "Designing Games with Game Maker", published Apr. 2, 2006, 289 pages.

Mark Overmars, "Learning Object-Oriented Design by Creating Games1", published Dec. 2004-Jan. 2005, 7 pages.

U.S. Appl. No. 14/094,493 Office Action dated Sep. 9, 2016.

Chinese Patent Application No. 201310656298.7 Third Office Action dated Aug. 21, 2017.

U.S. Appl. No. 14/094,493 Final Office Action dated Apr. 21, 2017.

U.S. Appl. No. 14/094,493 Office Action dated Dec. 22, 2017.

\* cited by examiner

SYSTEM AND METHOD FOR USER CREATION OF DIGITAL OBJECTS

CROSS-REFERENCE TO RELATED APPLICATIONS

This application claims benefit of priority of U.S. Provisional Patent Application Ser. Nos. 61/734,298, entitled "SHARING DIGITAL OBJECTS"; and 61/734,290, entitled "USER CREATION OF DIGITAL OBJECTS", all of which were filed Dec. 6, 2012, are owned by the assignee of the present application, and are herein incorporated by reference in their entireties.

FIELD OF THE INVENTION

This invention is in the field of digital simulations or online environments, and more particularly in the field of creating digital objects within such simulations or environments.

BACKGROUND

Building and sharing objects are popular and entertaining in games and simulations, as in real life. One way of building objects in video games is crafting, in which a set of skills or talents allows a player to make objects using gathered or purchased materials. For example, given iron ore that has been mined, a character with a blacksmith skill can craft a sword. Objects may also be obtained by trading with other players (or more accurately, to other player characters), e.g., by barter or a currency transaction, where the currency is in-game or real. Players can perform such functions "manually", or marketplaces have been created where such may occur (such as Station Exchange® or auction houses). In auction houses, players (or their player characters) may not only purchase items but may also in some cases see the identity of the seller. Such functionality makes clear, e.g., to whom compensation for a purchased item is going and may allow such sellers to take pride in their goods.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Implementations of systems and methods according to present principles enhance and improve current methods of object creation. In such systems and methods, in addition to keeping track of a seller of an object (as seen, e.g., by an auction house notation), the identities and contributions are maintained of creators of component or subcomponent parts, or those who provided or crafted materials, either for a component or for the finished item, or those whose skills or talents contributed to the creation or obtaining of an item, component, subcomponent, or material, allowing subsequent benefits to such creators, including compensation or recognition.

Various ways exist for users to create objects in online environments such as games. These ways include using in-game systems and methods, as well as using out-of-game ones. The former use tools within the game to create new game objects, and the latter use external tools to create objects which are then converted to game objects, e.g., Sony Online Entertainment's Player Studio™. One way of building objects, which may be either in-game or out-of-game, is by use of tools as disclosed in U.S. Provisional Patent Application Ser. Nos. 61/734,290, entitled "USER CREATION OF DIGITAL OBJECTS", and 61/734,287, entitled "BUILDING DIGITAL OBJECTS WITH BLOCKS", noted above. A spectrum of building methods may be seen: (1) creators may purchase and assemble already-finished components into a larger object; (2) creators may build every feature, i.e., "laying down" every voxel (where a voxel is a basic modular building block in the system); or (3) a combination of (1) and (2).

However the digital item is made, systems and methods according to present principles track the identity and contribution of crafters or creators of component and subcomponent parts, materials, and skills that are used to build the item. The systems and methods may also track those who contributed to the final building process itself, e.g., those who helped the subject creator build the castle which was made from purchased stone blocks. Such tracking and attribution may persist through future sales and modifications of the item, so long as the component, subcomponent, or material remains. As is described in U.S. Provisional Patent Application Ser. No. 61/734,298, entitled "SHARING DIGITAL OBJECTS", the tracking allows attribution and recognition of such creators and crafters, which in turn allows significant benefits.

The created digital objects may be thought of not only in their "substance"—as an assembled collection of constituent components, i.e., as an "object"—but also as having a value in their blueprint or "recipe", i.e., as a "template". Thus, either templates or objects may be created according to present principles. In many cases, users will create an object, and then the system will allow the subsequent generation of a template for the object. It is noted that where a template is sold, the purchaser generally has to acquire the necessary components, and put them together, in order to actually obtain a copy of the object for their use in-game.

To accomplish the above, in one implementation, an object-tracking system is employed which keeps track of objects as they are created, and in particular maintains information about the creators or crafters of components, subcomponents, materials, and talents or skills employed in the creation of a digital item to provide compensation and recognition to such sources. The attribution system may keep track of objects and templates as they are created, so that when such items are sold, sources may be appropriately compensated or recognized.

Calculations for such compensation and recognition may be "subjective" such as via contract, or "objective" based on a system-calculable measure, such as a percentage of volume or surface area (visible or total) constituting a source's contribution. Another such objective measure may be voxel count, where a "voxel" is a basic building block used in some online environment building schemes, including those described in the provisional patent applications noted above. Other objective calculations will be seen, such as based on "visible" voxels (those voxels visible to a user of the game), complexity, e.g., to compensate especially complicated or artful structures, total time required for construction, and the like. Contributions for skills may be based on time, cost to acquire the skill, or any number of other such calculations. The attribution may likewise allow non-financial recognition of such creators and creative inputs, e.g., via badges or achievements or the like.

Variations abound and will be seen. For example, while the invention is primarily in the field of digital objects and templates (cumulatively "items") in multiplayer video games, the same may be expanded to any environments allowing for the creation of digital items. In another implementation, a copy detection tool can be employed to prevent the creation of illegitimately-copied items and the subsequent undesirable reduction of value of created objects.

In another variation, systems and methods according to present principles may also include an object-influence tool which can work with the object-tracking system (or which can work independently). For objects or components that are oft-used in digital items, e.g. oft-purchased as components for created items, or which have significant popularity (e.g., many "likes" in implementations where users can indicate their affinity or appreciation for a product in that way), such objects may be made preferentially available to creators, such as via special pricing, to encourage the use of such objects. The preferential treatment may be performed automatically, by the system, so as to recognize the creator's contributions, and in some implementations to give the creator recognition. For example, a finely-crafted armor set may influence armor worn by the city guard. Particular colors for objects may also be propagated in this way, along with numerous other game aspects.

In one aspect, the invention is directed towards a method of making a digital item, including: receiving an indication of a first element associated with a first source to include in a digital item; receiving an indication of a second element associated with a second source to include in the digital item; creating a digital item including the first and second elements; and creating a first data structure, the data structure including an indication of the first element, the first source, the second element, and the second source.

Implementations of the invention may include one or more of the following. The digital item may be an object or a template. The method may further include: receiving an indication of a skill to be used in the making of the digital item, and a third source associated with the skill, where the creating of the digital item includes using the skill; and including in the data structure an indication of the skill and the third source. The skill may operate on the first or second element, or both. The skill may operate to join the first and second elements. The skill may operate to join the first or second element into the digital item. The first or second elements may be materials, and the skill may operate to transform the first or second element into a component or subcomponent. The data structure may further include a value of the first element or the second element, or both. Upon a transaction including the digital item, a benefit may be caused to be transmitted to the first source, the second source, or both. The first or second element may be a component, a subcomponent, or a material. The first or second element may be a voxel. The method may further include receiving a definition of a geographic extent within the online environment, the geographic extent defining a location for the item, and the first and second elements may be placed within the geographic extent. The method may further include receiving an indication from a user of a set of elements within the geographic extent, and creating a second data structure from the set of indicated elements. The item may be an object, and the method may further include converting the object to a template upon command of a user.

In another aspect, the invention is directed towards a non-transitory computer-readable medium, including instructions for causing a computing environment to perform the above method.

In a further aspect, the invention is directed towards a digital item, stored on a non-transitory computer-readable medium, made by the above method.

In yet another aspect, the invention is directed towards a method of making a digital item, including: receiving an indication of a first element from a first source to include in a digital item; receiving an indication of a second element from a second source to include in the digital item; by receiving an action from the first source and the second source, creating a digital item including the first and second elements; and creating a data structure, the data structure including an indication of the first element, the first source, the second element, and the second source.

Implementations of the invention may include one or more of the following. The first and second sources may be characters in an online game. The characters may be controlled by users or may be AI controlled, or both. Upon a transaction including the digital item, a benefit may be caused to be transmitted to the first source, the second source, or both. The method may further include receiving a definition of a geographic extent within the online environment, the geographic extent defining a location for the item, and both the first and second elements may be placed within the geographic extent. The first and second actions may be selected from the group consisting of: deploying or operating on a voxel, a component, a subcomponent, or a material, or performing a skill.

In another aspect, the invention is directed towards a non-transitory computer-readable medium, including instructions for causing a computing environment to perform the above method.

Advantages of the invention may include one or more of the following. When an object is created, data about the creator and others builders, as well as about the crafter of each component (and subcomponent and material), may be maintained to allow subsequent attribution functionality, and in particular, benefits and recognition to the creators. More rights may be enabled then in prior systems, because separate rights may attach to the object itself and to a template that completely describes the object, thus enhancing the user experience. Other advantages will be apparent from the description which follows, including the figures and claims.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

Corresponding reference characters indicate corresponding parts throughout the drawings. Elements are not drawn to scale unless otherwise indicated.

DETAILED DESCRIPTION

Figure 1:
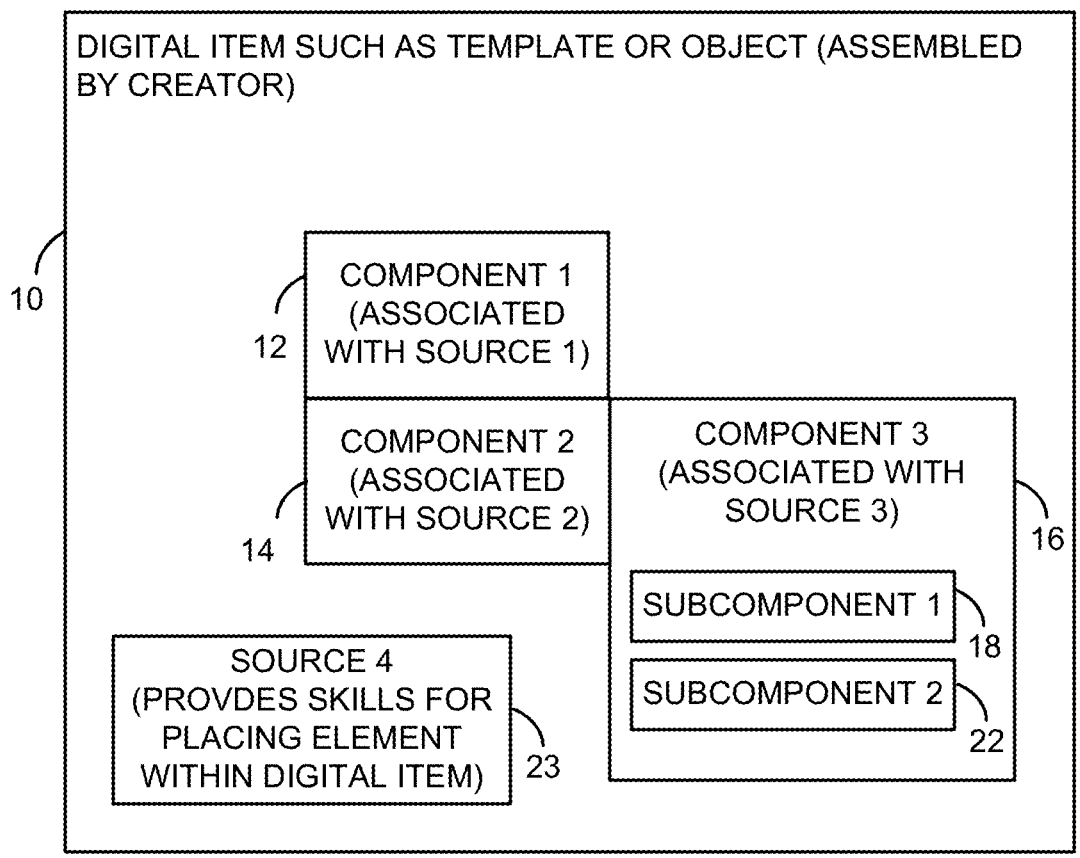
FIG. 1 is a schematic diagram of a digital template or object, including a number of components and subcomponents, which may be transacted using systems and methods according to present principles.

In this specification, certain terms are used and such terms are defined below.

An item may be a template or object. More specifically, a "template" is a recipe, blueprint, schematic, or other data object which includes information about the components that make up a computer-generated or digital object (including subcomponents and sub-subcomponents and so on, as well as materials, skills, etc.), cumulatively "elements", and may further include information about how the components are put together to make up the object, i.e., what talents, steps or skills are required in its construction. The template may further include information about the sources of components, subcomponents, and materials, which are in many cases the creators, source, or gatherer of those components. The system thus maintains the identities of those who have created the elements in the various ways, e.g., by crafting, collecting, mining, harvesting, or other means. Having a template allows a player to re-create the digital object, termed occasionally a "resultant object", although the player may still be required to accumulate or obtain the various components and/or materials listed in the template, e.g., by purchasing or making the same. In some cases, a user is also required to accumulate skills necessary to put certain elements together, or to create components or subcomponents, or to obtain materials, or a user may be required to work with other users to put the elements together. Other variations will also be seen.

A source, such as a creator, builder, or gatherer, is one who chooses, collects, and/or puts together elements, which may be represented as voxels, to create an object. Besides the act of putting together elements, which may constitute putting constituent elements next to each other, sources may also exercise skills or talents in choosing and operating on elements: for example, to fabricate a wall, a source may have to exercise a skill to cement a number of stone blocks together.

A component is a type of constituent element of an object. A component may be made of raw materials or may be "finished". For example, a component may be a collection of stone blocks (which may be thought of as a "wall"), and the stone blocks may be the finished subcomponents of the raw material "stone". As another example, a component may be a finished component such as a hilt of a sword. A subcomponent (and so on) are constituent parts of components. For example, the subcomponents of a hilt may include a guard, a grip, and a pommel.

In general types of constructions, rather than specific object parts such as hilts, components or building blocks may be "voxels" or polyhedra formed of various types of materials, and which may be placed together in any arbitrary fashion. Voxels may have arbitrary shapes, although in many implementations they are represented by rectangular solids or cubes. From such, a user may construct a stone wall, metal armor, or the like. Certain aspects of construction using such building blocks are described in the co-pending US patent applications incorporated by reference above.

A "claim" is a geographic extent such as a piece of property in an online environment on which a resultant item is built or placed. In many cases resultant objects placed on claims are immovable, but in other cases such may be relocated to another location in the online environment, e.g., onto another claim. In some implementations, claims may be bought and sold, including objects or templates located on the claim. However, in certain implementations, if the seller did not take part in the construction of the template or object on the claim, the seller may receive no remuneration or compensation from the sale of the same, e.g., as no constituent elements are associated with the seller, in the sense of the seller having expended effort to create such.

Referring to FIG. 1, an item such as a template or object 10 is illustrated which includes a number of components 12-16. These components are associated with respective sources. The component 3 (element 16) has two subcomponents 18 and 22 shown. The subcomponents may themselves include sub-subcomponents. Each component, subcomponent, sub-subcomponent, material, and so on, or indeed the entire assembly, may be made by different individuals or groups of individuals. Similarly, one individual may make more than one of the components or subcomponents.

Templates or objects may be created by players or provided by the game environment. Game items can include usable items, such as clothing, equipment, weapons, vehicles, furniture, structures (e.g., houses, shops, or other buildings). Game items can include active game entities, such as people, animals, monsters, insects, etc. Game items can also include logic or preferences defining behavior patterns or operating characteristics indicating how an object will act or respond, such as the behavior of a guard, dragon, or trap door. Game items may also include item components, such as textures, colors, text, audio, music, video, animations. Game items can include environments, which may in turn include other game items, such as dungeons, cities, shops, public transportation, dynamic events, or mini-games. For example, a game item could be a castle including multiple structures, furniture, people, guards, animals, and an assortment of food such as fruit and cheese. Not all item types will necessarily be supported by in game tools in all implementations.

Figure 2:
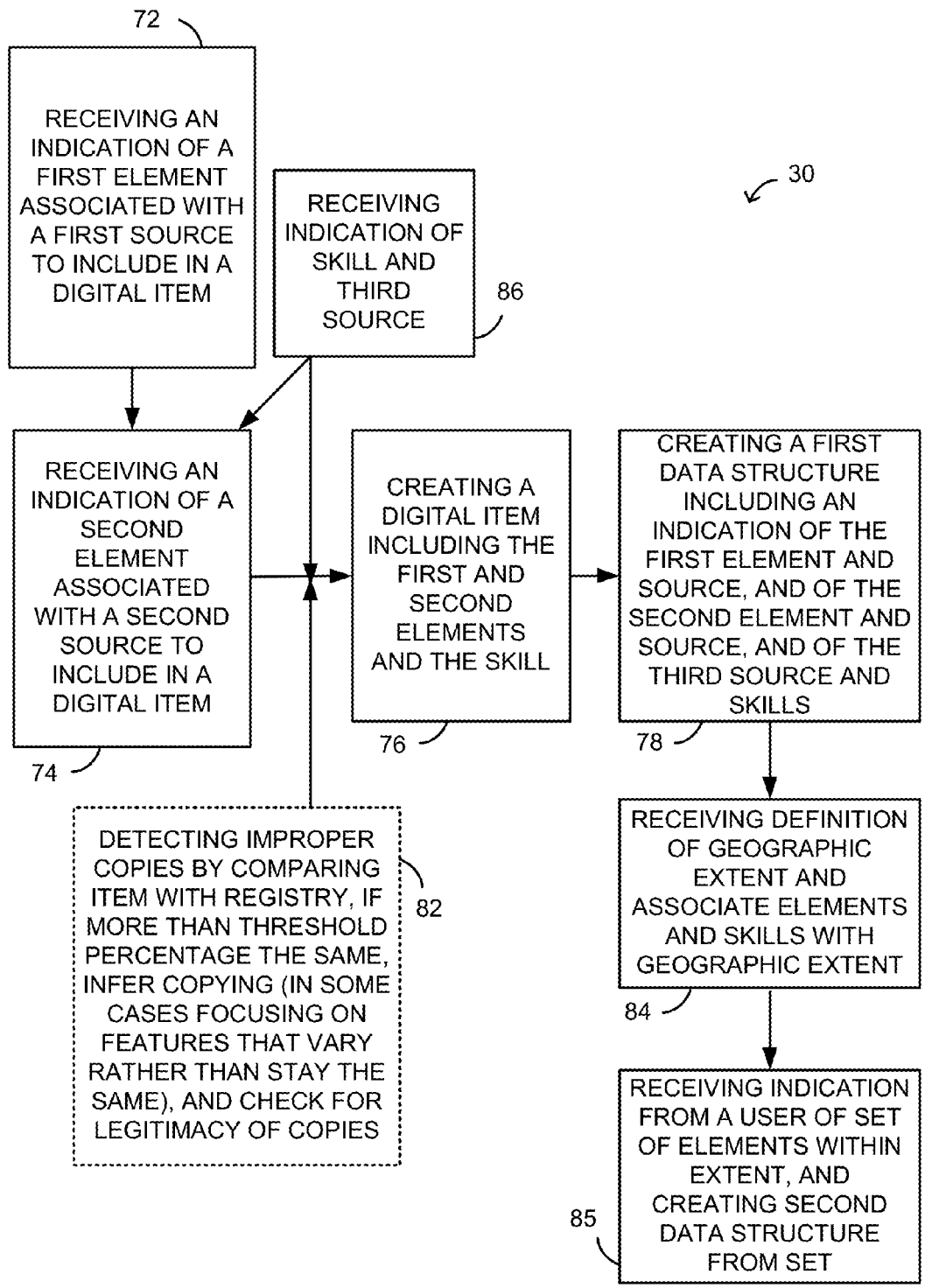
FIG. 2 is a flowchart according to one implementation of present principles.

A general method according to present principles is illustrated by the flowchart 30 of FIG. 2. A first step is the receiving of an indication of a first element associated with a first source to include in a digital item (step 72). A second similar step follows in which an indication is received of a second element associated with a second source to include in the digital item (step 74). In a related step, a skill may be indicated and associated with a third source (step 86), such as a skill necessary to construct the digital item, either the skill operating on the first element, the second element, their combination, or another aspect of the item.

The digital item may then be created including the first and second elements and the skill (step 76). A data structure may be formed (step 78) as part of the creating, or via a separate step. The data structure includes an indication of the first and second elements, as well as their sources, as well as the third source and the associated skills. The data structure is indicated in greater detail in the following figure. Prior to, contemporaneously therewith, or subsequent to the creation of the digital item, a geographic extent may be received, and the digital item including its elements and skills may be associated with the geographic extent (step 84). The geographic extent generally corresponds to a piece of property in the online environment or game. In some cases, an object on a claim can only be sold along with the claim. In other cases, objects can be moved off of the claim and sold. In other cases, a user may indicate a portion of a digital item, resident on a claim, with which to sell or to make a template of, the template then sellable on its own. For example, a castle may be on a claim, and a user may indicate a desire to sell a tower or a template thereof. In this case, an indication is received and a second data structure is created (step 85).

During a creation, a step may be performed of detecting an improper copy (step 82). In more detail, as a template or object is about to be created, or is in the act of creation, the same may be compared with a registry of digital templates or objects within the game to determine similarity with such items. If the similarity is greater than some threshold percentage, copying may be inferred. In such similarity analysis, particular focus may be on features that vary, i.e., complex features, rather than on features that do not have significant spatial variation, e.g., walls or foundations. If an object or template is found with substantial similarity, especially in complex features, then a check may be made as to whether the creator of the subject item is the same as the creator noted in the registry, or if the creator of the subject item was a legitimate transferee of rights. If so, the creation may be allowed, while if not, the creation may be prohibited. Additional details of such copy detection systems and methods are described below in connection with FIG. 9.

Figure 3:
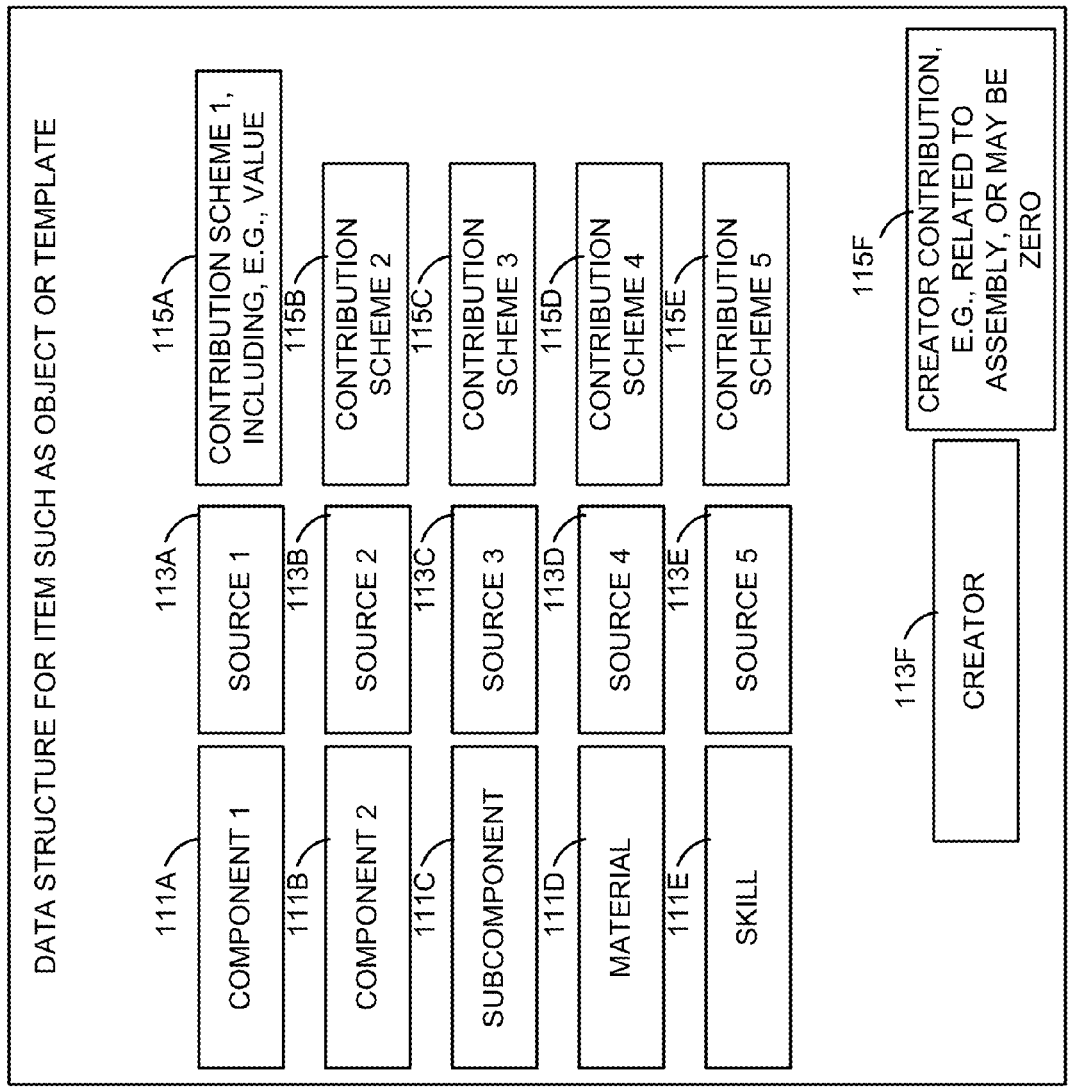
FIG. 3 is a diagram of a data structure according to an implementation of present principles.

FIG. 3 illustrates a schematic of an exemplary data structure 40 that may represent a digital item such as an object or template. The data structure is generally stored on a non-transitory computer readable medium, such as in RAM or on a hard drive on a server. The data structure may include aspects of a first and second component associated with the item, these represented by components 111A-111B. A subcomponent 111C is illustrated, and the subcomponent may be a portion of any of the above-named components or of other components (not shown). A material 111D is shown, to represent that materials, which may be mined, created, or otherwise obtained, but are generally not finished components or subcomponents, may also be included in the structure of an item. Also illustrated is an exemplary skill 111E. The skill 111E may be provided for a number of purposes, including to operate on any of the components or subcomponents or materials, to join various components or subcomponents or materials, to operate on the partially-assembled item, or for other purposes.

The components 111A-111B are linked in the data structure to first and second sources 113A and 113B respectively. The subcomponent is provided by and linked to a third source 113C, and the material is provided by and linked to a fourth source 113D. The skill 111E is associated in the data structure with a fifth source 113E. A set of contribution parameters or schemes 115A-115E is noted in the data structure, associated with sources 113A-113E and their associated contributions 111A-111E. Also shown in the data structure is an identification of the creator 113F, which may be associated with a creator contribution 115F. The creator may be in some cases the instigator of the project that resulted in the item, the owner, the organizer, the designer, the responsible party, or in some other fashion the generator of the item. The creator contribution 115F may be substantial if the creator performed significant amounts of work in construction, or exerted significant amounts and levels of skill. On the other hand, the creator contribution may be low if the creator merely assembled a number of completed elements together, wherein the assembly was minor. Of course, the creator may have spent significant resources on obtaining the elements that are combined together and so the value of their combination may be at least the sum of their individual values. In any case, the notation of the contribution scheme within the data structure 40 ensures that subsequent uses of the item represented by the data structure will entail compensation or recognition, or both, to the sources of the components, subcomponents, materials, and skills that constitute or contribute to the item.

Figure 4:
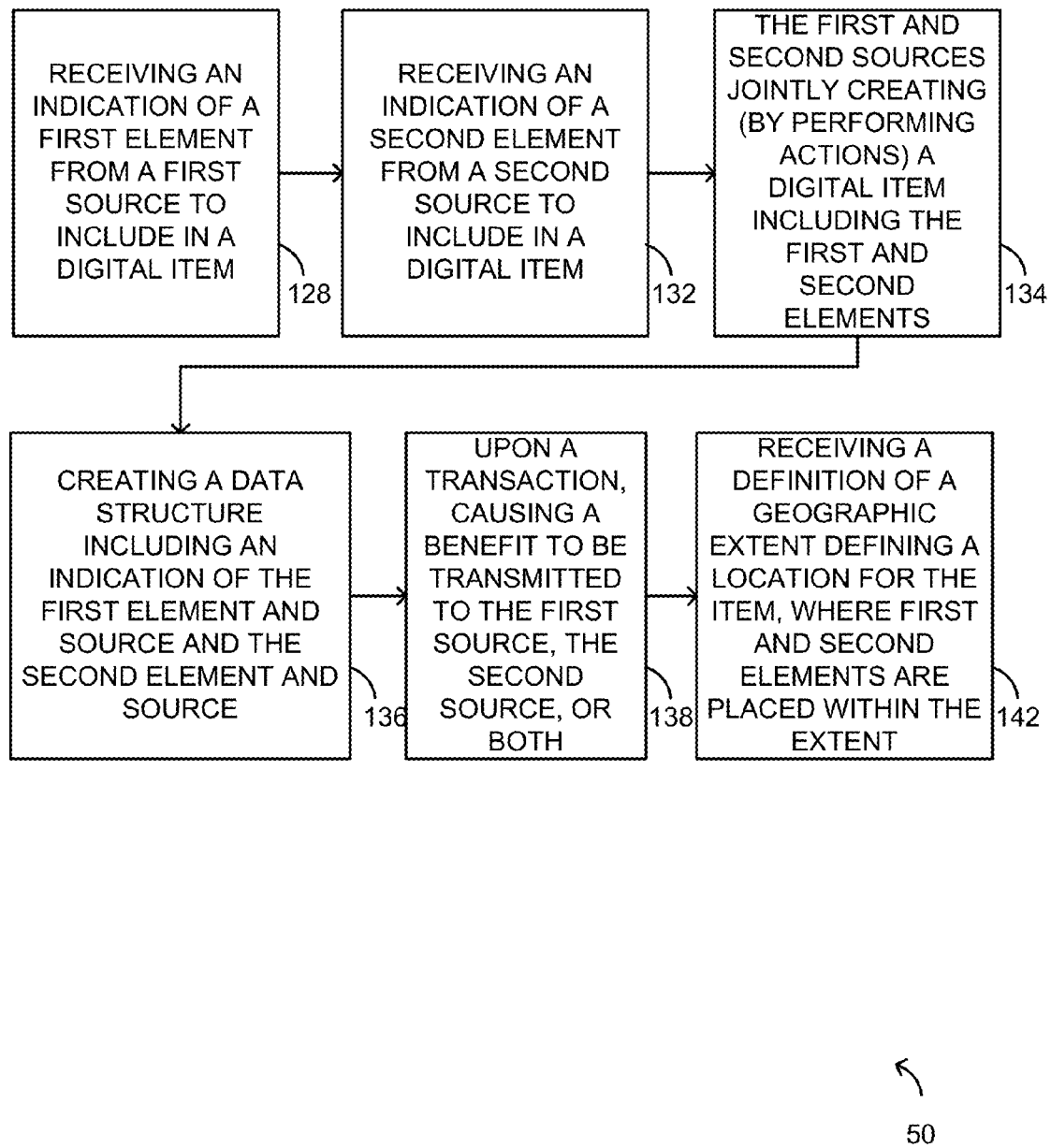
FIG. 4 is a flowchart according to another implementation of present principles.

FIG. 4 is a flowchart 50 illustrating a specific implementation of a method according to present principles. In this method, rather than the creator being responsible for final assembly of the digital item, two or more creators work together to create a digital item. In one implementation, the two creators may work together in a specific location, such as on a claim or other geographic extent. In other implementations, the two creators may work separately and come together with finished components (or subcomponents or materials) or skills and assemble the item accordingly. In a first step, an indication is received of a first element from a first source to include in a digital item (step 128). In a next step, an indication is received of a second element from a second source to include in a digital item (step 132).

In a next step, the first and second sources jointly create a digital item including the first and second elements (step 134). Alternatively, the first and second sources may jointly create the digital item using other elements, from other sources. A data structure is then created including an indication of the first element and source and the second element and source (step 136). Such a data structure can take the form indicated in FIG. 3, and can include any number of various elements, such as components, subcomponents, materials, and skills.

Upon a transaction, such as a sale or license of rights to an object or template corresponding to the digital item, a benefit is transmitted to the first source, the second source, or both (step 138), according to the contribution and compensation scheme set for the item. Such may include those described above, including objective compensation schemes, subjective compensation schemes, such as those set by contract between the sources, or the like. In an optional step, a definition of the geographic extent defining a location may be received for the item, and the first and second elements may be placed within the extent (step 142). In so doing, the first and second elements may be simply placed within the extent, may be constructed within the extent, or the like. In a particular implementation according to present principles, when a joint construction effort is commenced between first and second sources, the project will be completed within a single claim, and control of the claim then determines control of the object. For example, either the first or second source may own the claim, a third-party may own the claim, the first and second sources may own the claim jointly, or any number of other ownership structures may be instituted.

Figure 5:
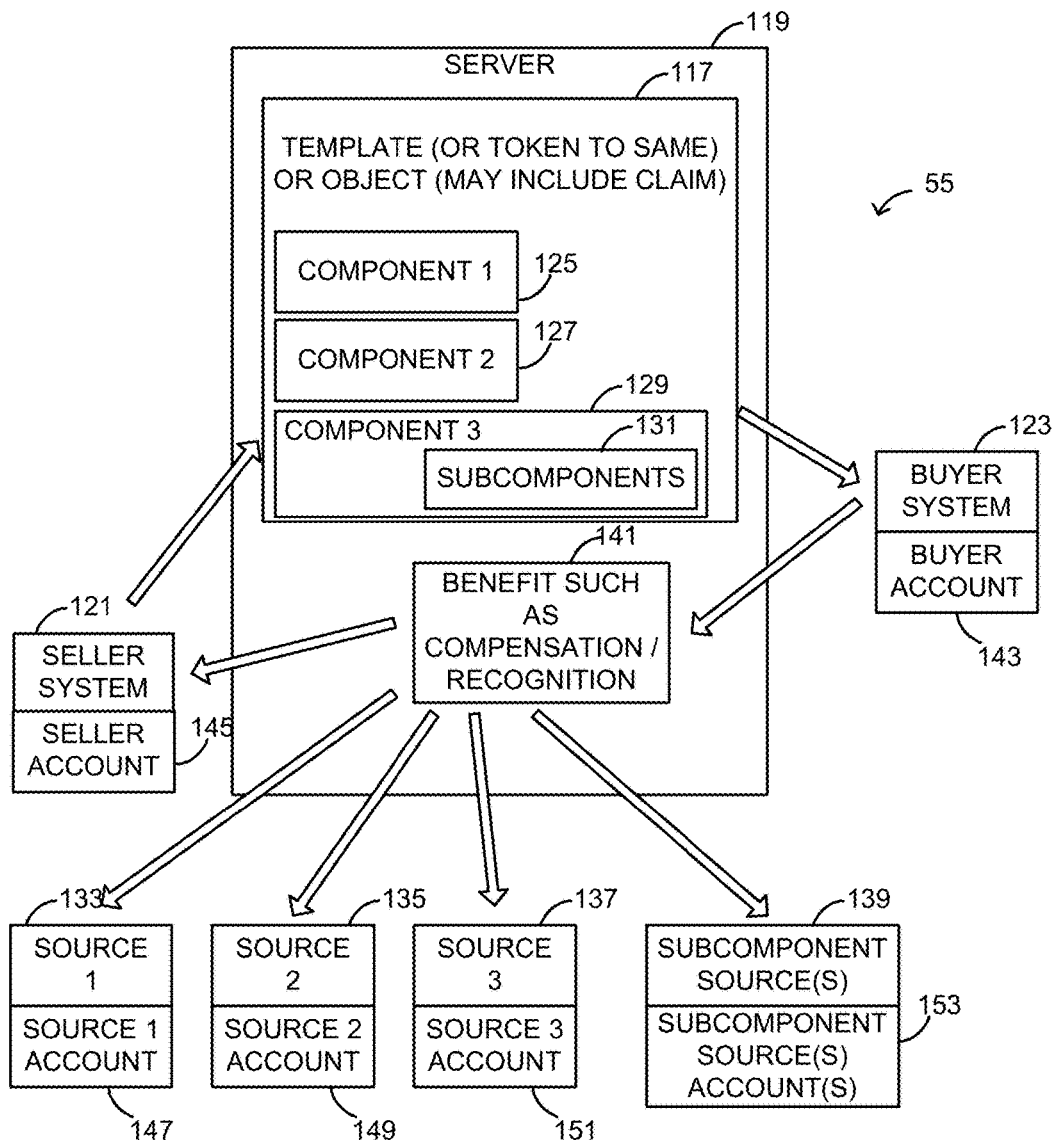
FIG. 5 is a logical diagram of elements in a system performing a transaction of rights to a digital object or template, including a buyer system, a seller system, a server, and various sources of components and subcomponents.

In one implementation, and referring to FIG. 5, the system includes an item tracking system 55, i.e., for objects and/or templates, and more particularly for the sale or license thereof. The item tracking system 55 generally runs on a server 119 but modules of the same may optionally run on one or more client systems. The system 55 keeps track of the origin of items (including constituent elements) and the use of items in the game and in other objects or templates. The item tracking system 55 can manage attribution so that users can see who created an object (a specific object or the original template from which a copy was made), or the components of an object, shown in FIG. 5 as first, second, and third components 125-129 of the template or object 117. The third component 129 includes one or more subcomponents 131. The item tracking system 55 keeps tracks of the makers or creators of such components and subcomponents, illustrated in the figure as sources 133-139.

The item tracking system 55 can also track the use, sale, or other transfer of rights relating to the template or object 117 from a seller 121 to a buyer 123 and the contribution of elements to sold items. This tracking is useful to provide benefit 141 back to the sources 133-139, i.e., the creators and contributors, which benefit may be in the form of compensation or recognition, e.g., points, reputation, prizes, and the like. In the case of compensation, the amount paid by a buyer is debited from a buyer account 143 and is credited in part to a seller account 145 as well as to accounts 147-153 associated with the sources 133-139, respectively. In an exemplary implementation, where copies of certain items can be freely or cheaply made, each copy may instead grant reputation or popularity points to the item creator (or creators in proportion to their contribution).

In a template or object marketplace, each sale of an item may provide a payment back to the creators of the item. For example, player A may create a wood texture and put the texture up for sale in the marketplace. Player B buys the wood texture, makes a door using the texture, and adds the door to the marketplace. Player C buys the wood texture, makes a drawbridge, and adds the drawbridge to the marketplace. Player D buys 4 doors from player B and the drawbridge from player C and then builds a castle using the doors and drawbridge. When player D sells the castle to player E, portions of that sale price go back to each of players A, B, C, and D based on their items' contribution to the castle. In one implementation, an automated system is used to determine the percentage contribution, e.g., based on relative size when rendered. In another implementation, sellers can place royalty rates on their items when they place the same in the marketplace. The benefit scheme can be based on a number of other factors as described below in connection with FIGS. 6-8.

Figure 6:
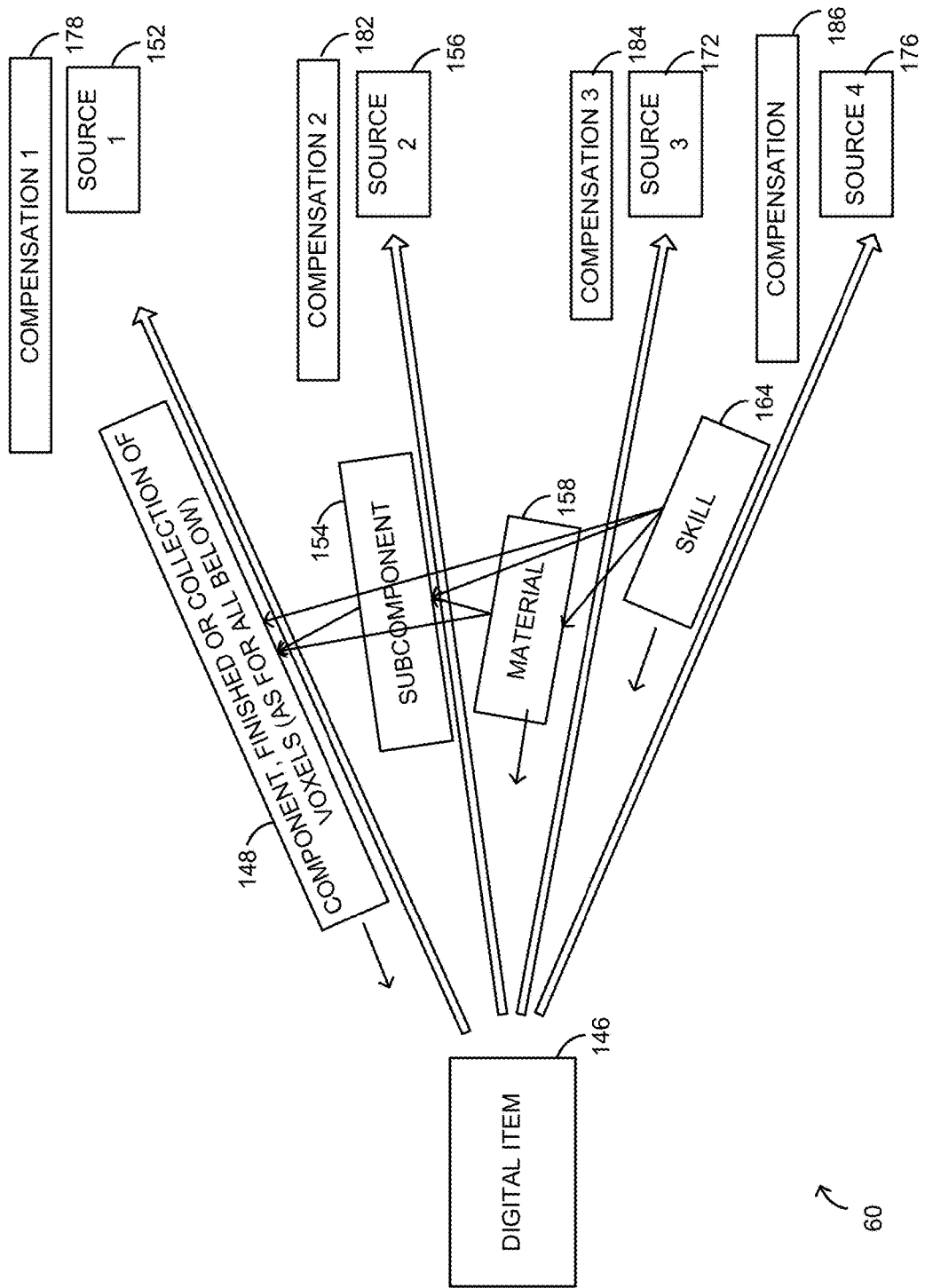
FIG. 6 is an illustration of compensation flowing to sources based on an objective distribution.

FIG. 6 is a chart 60 illustrating a compensation scheme for an item 146 having an objective distribution. In the chart, a first component 148 is associated with a first source 152, a subcomponent 154 is associated with a second source 156, a material 158 is associated with a third source 172, and a skill 164 is associated with a fourth source 176. The first component is illustrated as larger than the second component, which is in turn larger than the third component, to indicate that in some objective fashion the first component warrants more compensation than the second, which in turn warrants more than the third. For example, the complexity of the first component may be greater than that of the second. The number of voxels in the first may be greater than the number in the second, or the number of visible voxels may be greater, or some other objective measure may indicate that the value of the first is greater than the value of the second. In another objective fashion, but directly not related to physical properties, the value of the first component may be greater than that of the second as judged by, e.g., a marketplace such as an auction house or other source. Numerous other ways of valuing components will be apparent given this disclosure.

As the first component 148 warrants more compensation than the second, and the second more than the third, the respective compensations have been similarly sized, at least qualitatively. That is, the first compensation 178 for component 148 is greater than the second compensation 182 warranted for the second component 154, and so on for the third compensation 184 and a fourth compensation 186 illustrated for performance of the skill 164 by the fourth source 176.

In one implementation, if the creator contributed no voxels (in the sense of deploying or using them in the item), nor exerted any building efforts or skills towards completion of the item, the same may not be due any compensation at all. However, in many other implementations, the creator may have assembled various components, or may use some skills to do so, and so in return for such compensation or skills the creator warrants a compensation. In other variations, the act of assembling the components, subcomponents, and materials together may warrant compensation to the creator. In yet another variation, the collecting or compiling of the components and other necessary materials, including payment for the same, warrants compensation to the creator.

Figure 7:
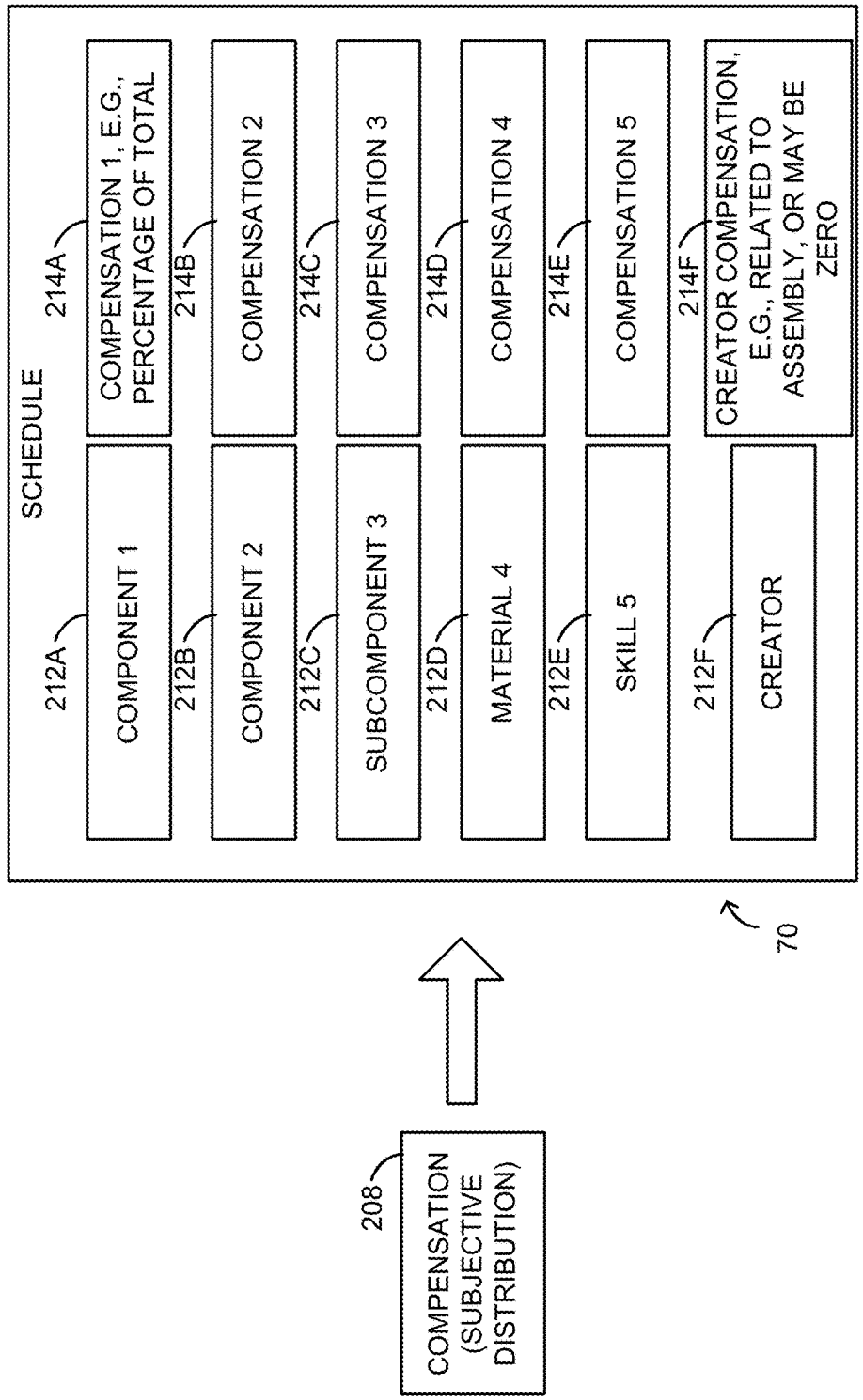
FIG. 7 is a schedule of compensation flowing to different sources, based on a subjective distribution, such as when parties determine apportionment of compensation by contract.

FIG. 7 is a chart 70 illustrating a compensation scheme having a subjective distribution for compensation 208. In this case, various sources, builders, materials providers, and assemblers agree "by contract" what each is entitled to in return for the rights to their contributed elements in the digital template or object. For example, a crafter may create a door that is very popular, i.e., may create a template for such a door. Builders or other assemblers may wish to purchase the template for the door for use in their own creations. They may agree to pay the original craftsman of the door a set percentage royalty or an amount certain per door.

In the schedule 70, first through fifth components, subcomponents, materials, and skills 212A-212E are illustrated with corresponding compensation values 214A-214E. the compensation values may be set values, percentages, formulas, recognition benefits, combinations of compensation and recognition benefits, or any number of other such schemes of varying degrees of complexity. The schedule 70 also shows a compensation 214F due to a creator 212F, which as noted may be due to creator building efforts, creator work in assembling components, creator collection of components and materials, or the like. Using such a schedule, upon a transaction, the item may be provided to the buyer and benefits may flow to the sources according to the scheme set forth.

Figure 8:
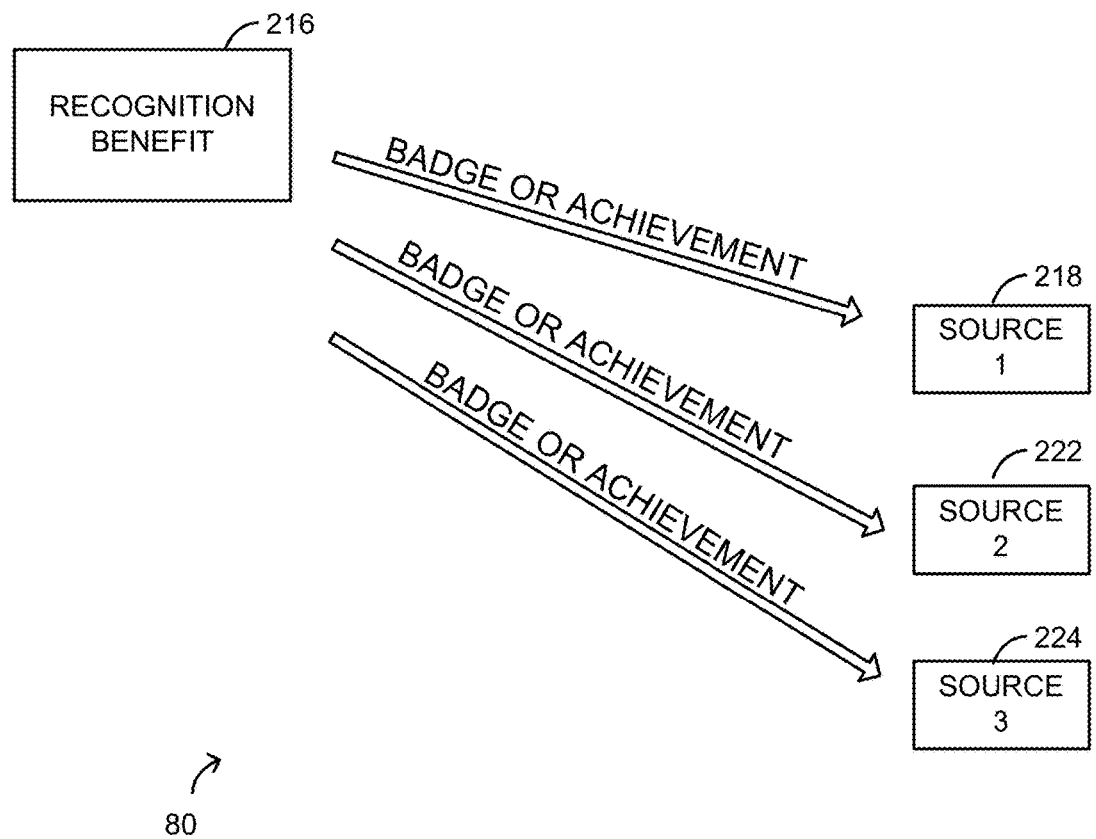
FIG. 8 is an illustration of recognition benefits flowing to sources.

FIG. 8 illustrates a chart 80 showing provision of recognition benefits 216 to various sources 218-224. The recognition benefits 216 may be in place of or in addition to compensation benefits, and may include badges, achievements, points, reputation, experience points, or any other sort of recognition. Recognition benefits may be provided, to a player character who crafted the elements in-game, e.g., by providing the same with badges or other paraphernalia with which to adorn the avatar of the player character, or by providing notifications such as achievements on a player character profile or other community-accessible board or site. Recognition benefits may also be provided to a player or user, by noting an achievement or other notification, e.g., "Master Builder", with their user name or user ID. Groups of player characters such as guilds may perform projects, with ensuing guild benefits, such as compensation and/or recognition.

Figure 9:
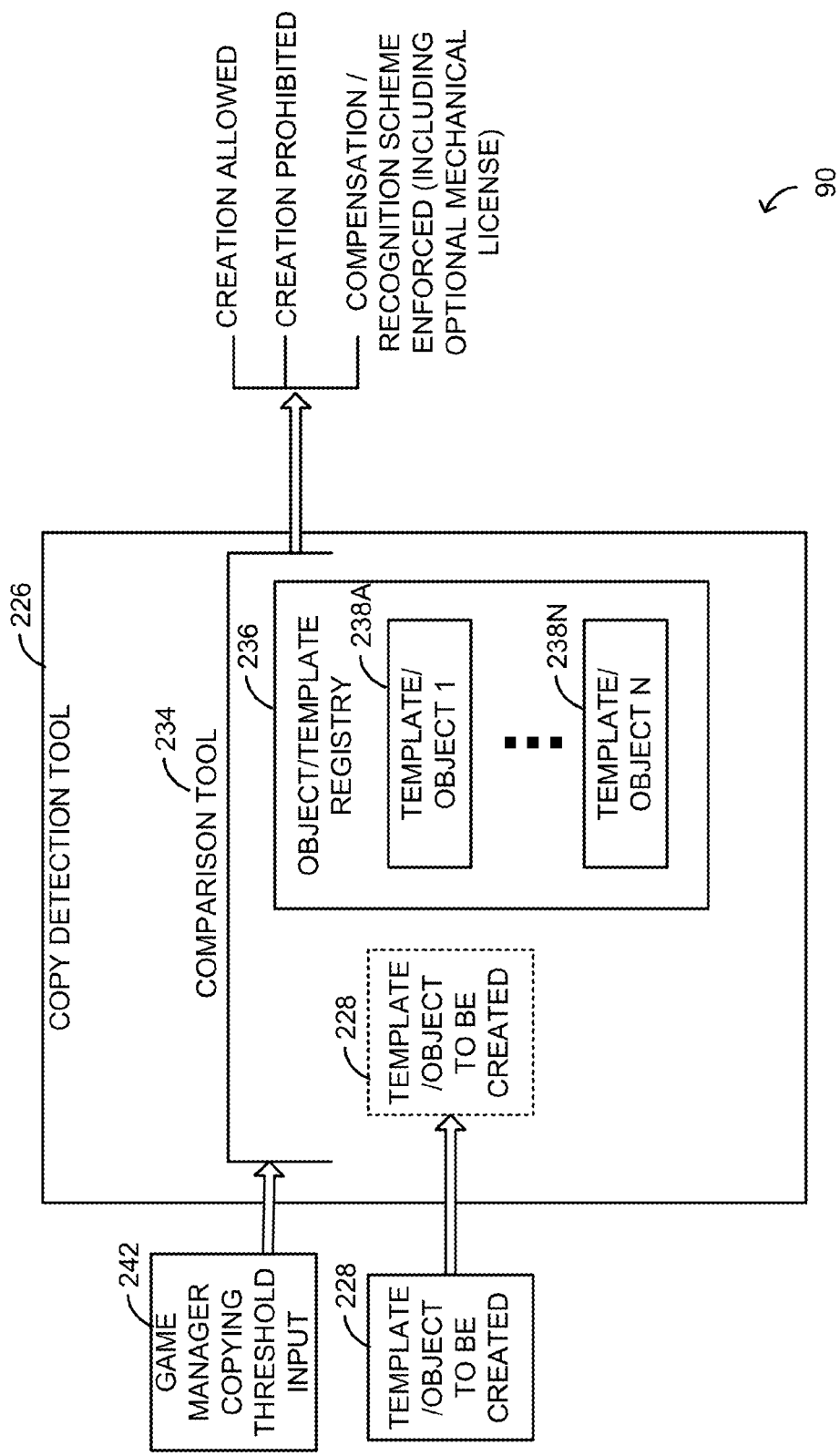
FIG. 9 illustrates a logical diagram of a copy detection tool which may be implemented in systems and methods according to present principles.

Referring to FIG. 9, and as noted above, the systems and methods according to present principles may include a copy detection tool, and the same is illustrated as a tool 226 in a copy detection system 90. The copy detection tool 226 receives a potential object or template 228 which is intended to be created as a final object or template and compares the same against a number of objects 238A-238N in an object/template registry 236. Such comparison may be performed prior to or during item creation. The copy detection tool evaluates a created template or object for similarities with existing items. Similarity analysis may be performed on an overall basis, on a component-by-component basis, or via a hybrid analysis (or via other techniques). Depending on the determined percentage of similarity, the copy detection tool may control the creation or use of the new item. The threshold for copying may be input by a game manager as a threshold 242, and the same may be expressed as a percentage of like voxels, like surface area, like volume, like "visible" aspects as noted above, and so on. Exemplary thresholds include 50%, 75%, 95%, 100%, and, e.g., values therebetween.

Depending on the results of the comparison, various actions may be taken. For example, if the object or template to be created 228 does not meet the threshold for copying, creation may be freely allowed. On the other hand, if the object or template 228 to be created meets the threshold for copying, a creation may be prohibited unless legitimacy is established by a proper trail of transfers to the current creator. In another implementation, if the object or template meets or exceeds the threshold for copying, a benefits scheme may be automatically enforced. For example, the system or user may set higher royalties or prices for unauthorized copying, or a mechanical license may be instituted to compensate the original creator for the copying. In some implementations, copying may be prohibited for user-created items, but may be allowed for system-created items. In some implementations, the system can determine whether a "later" creator who created an item had access to an earlier-created item, of which copying is suspected. If no access was had, independent generation of the item may be inferred, and the item creation may be allowed.

In any event, such enforcement of penalties for copying, or restrictions against copying, has the benefit and advantage of maintaining the values of items, which values would in many cases be vastly-reduced if unauthorized copying were unfettered.

In a specific implementation, the game may prevent a new item from being finalized or from being used, e.g., from having a template created therefrom, or sold, if the new item is more than 75% similar to another user-created item. This could be lifted if the original author provides permission. In another implementation, an automatic royalty could be applied or required when a threshold is met. For example, creating a new object that is a copy would require a royalty back to the original author for each percent above a threshold (e.g., with an 80% threshold, a 5% royalty is required for an 85% copy).

Figure 10:
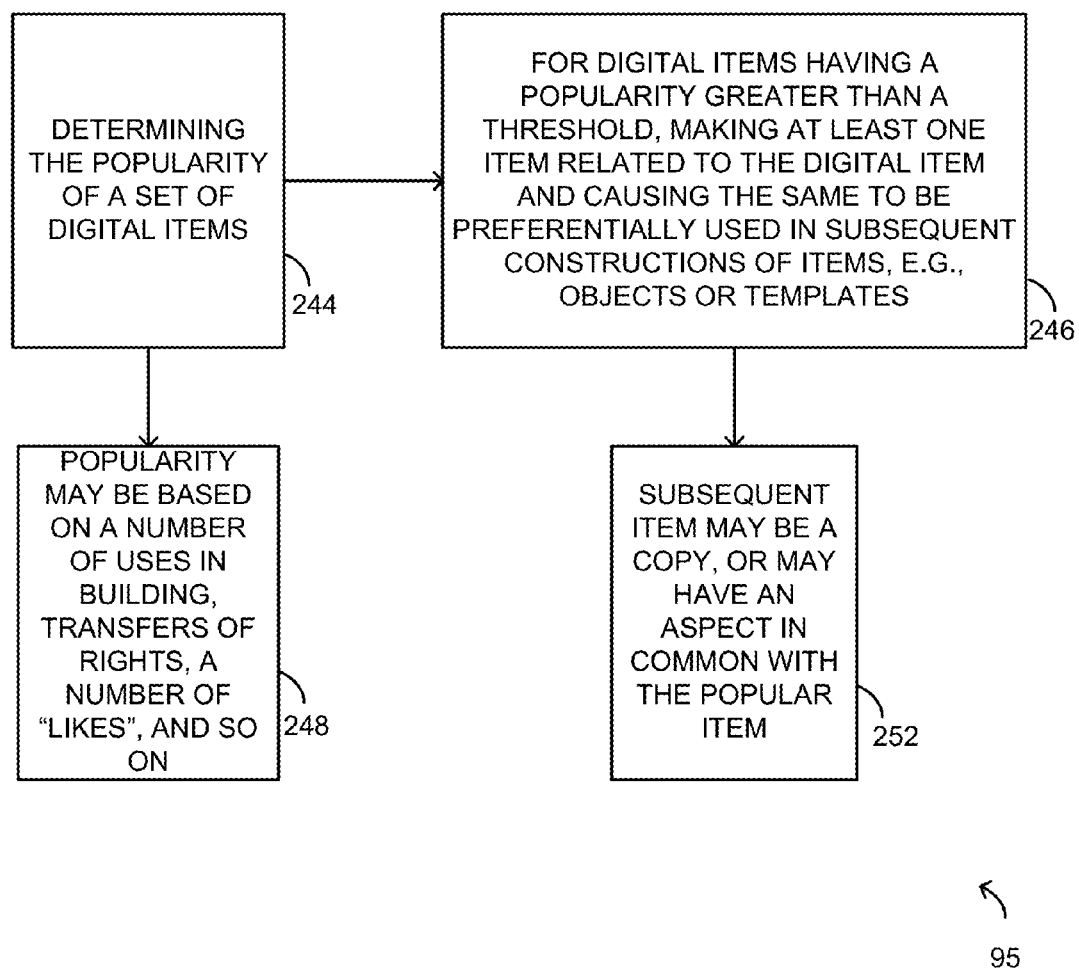
FIG. 10 is a flowchart according to another implementation of present principles, showing steps in a method for object influence.

In yet another implementation, and referring to the flowchart 95 of FIG. 10, systems and methods according to present principles may include an item influence tool. The item influence tool tracks the popularity of items and causes particularly-popular items to spread in the game environment. The tool performs a method including determining the popularity of a set of digital items such as templates or objects (step 244). For particularly-popular items, i.e., those having popularity greater than a threshold, either a relative threshold or an absolute one (e.g., an item is copied more than 100 times or is in the top five most "liked" items), the system and method may cause such items to be automatically-propagated in the online environment, e.g., the system may make copies of such items and distribute the same at various locations in the environment (step 246). The popularity itself may be based on a number of factors (step 248), including the number of creations or transfers of rights associated with the template or object. Where a "like" or other approval system is instituted, the popularity may be based on the number of "likes" or approvals. In some cases, the propagated item is one influenced by a popular item, or that has an aspect in common with the popular item (step 252), e.g., a particular style of texture, a particular color, and so on, rather than a direct copy.

As specific examples, a user creates a painting object and sells the object to another user. The buyer places the object in their housing. Other users see the painting and give it high ratings. In the marketplace, if copies of the painting object are for sale, the listing will indicate the item's popularity, and possibly where it can be viewed, e.g., who owns the painting object and where the same is located. As more users buy and place the object and more users rate it highly, the object becomes more popular. At a threshold point, the item influence tool will place and/or propagate the popular object in the game environment. For the painting object, the painting could be added as a painting on the wall of an inn. Visitors to the inn can then also rate the painting, further affecting its popularity. As the popularity grows, the item influence tool will place the object in additional game locations. For example, the object can appear in other areas players visit (city squares, castles, dungeons), stores, museums, and the like. Similar approaches can be used for any object—sculpture, clothing, weapons, armor, equipment, books, text, plays (written and performed), furniture, music, weapons, architecture, dance moves, monster behavior, weather effects, etc. The item influence tool collects ratings information for various objects based on user response, e.g., ratings for whether viewers like an object or behavior, or by analyzing use, e.g., sales. In another example, the item influence tool and the game environment systems interact to determine profiles for online characters in regions such as towns, kingdoms, etc. The profiles can be used to determine whether a computer-controlled character or region would like an object. In this way, items can become popular and spread through AI behavior and profiles as well as user ratings.

In another implementation, the object influence tool derives aspects or components of popular objects to create influences rather than direct copies. For example, if several items of very popular clothing are all a similar color, the color can become an influence. If a particular tower style is extremely popular, that tower or style can become an influence. To create an influence, the tool can extract one aspect from the popular object(s) and use it as the influence, e.g., a shape, pattern, color, etc. The object influence tool can then use those influences to adjust the game environment. For example, when blue is a popular influence, townspeople will wear more blue clothes. To facilitate this, components of objects can have dynamic attributes to adjust as influences change. For example, the types of swords carried by guards in a city may change over time as different styles become more popular and others fall out of fashion.

In item creation scenarios, popular items may be made more available, e.g., more varieties may be available of the popular item than of less popular items, or popular items may be priced lower than less popular items.

In another implementation, a user can place an object that is dynamic and adjusts based on user preferences and popular trends. For example, a user places a picture frame in their housing and the picture is updated daily to show the currently most-popular screenshot captured during a particular encounter or battle, e.g., instance, raid, PVP map, etc. Another example of a dynamic object is a magazine object, and such an object may include images or descriptions of popular objects, e.g., fashion magazines. Similarly, a radio object could play audio reflecting the most popular music.

In yet another implementation, user housing sharing is tracked with a housing management tool. User housing includes game spaces associated with a user or users and created and/or decorated with game objects and assets, e.g., colors, textures, audio, etc., by the user(s). As users share their housing with each other, allowing visits and views of their game housing, visitors and viewers can indicate their opinion, e.g., with a "like" button, a numerical score, or similar ways. A viewing user can indicate an opinion for the housing as a whole or for any pieces, and a similar mechanism can be used for indicating an opinion on any game object throughout the game, outside of housing as well. The game system may track the popularity of housing or other items to determine which houses or items are the most popular or highly-rated. In one implementation, a leader board system can display the results. In another implementation, popular housing is showcased in a public setting, such as in a capital city, and made open to the public (all users). In addition, awards, achievements, or prizes can be given for defined levels of popularity.

In yet another implementation, user-housing visibility is controlled by the viewing user's characteristics. In one example, a user can view in a section of town houses that belong to friends of the users, based on a friends list of the user. In another example, a street map reflects the social network of the user. The user's house may be at the center or front, and the first street represents the friends of the user and so has houses belonging to the user's friends. The next street(s) over represents users one step removed from the user—friends of friends—and so has houses belonging to friends of the user's friends, and so on. The layout may dynamically adjust (or between visits to the housing district) as friend relationships change. In another example, the visible housing is determined by preferences indicated by the user, such as color, theme, and player age.

In another implementation, the visibility of objects may also be determined by the viewing user's characteristics. For example, a user may define rules that certain objects in the user's housing are only visible to the user's friends and that some objects are only visible to specific people, e.g., a secret door only visible to friends. The same filtering or phasing could also be applied to a user's equipment or character appearance, e.g., outside of user housing. In another example, the appearance of a user's character can vary depending on the social network relationship between the users, e.g., friends' character names will appear in the UI in bright blue letters, and friends of friends' character names may appear in a dimmer blue, and so on, until a threshold is reached and character names are shown in gray.

Additional variations and implementations are also possible. The systems and techniques described above are not limited to the specific examples herein. For example, while discussed in the context of games and simulations, other implementations can include other contexts such as online environments, social networking, communication, mobile platforms, or shopping. While a particular way of constructing objects or templates has been alluded to, i.e., building with constituent blocks, it will be understood that other ways of such creation of digital objects may also be employed. For example, a user could create an object outside of the online environment, e.g., using Maya®, and the same may be appropriately converted for use in the online environment. In so doing, a user may provide to the system digital assets such as artwork, descriptions, images, flowcharts, audio, video, or music, and the computer system than converts these out-of-game objects into in-game objects. In one implementation, the conversion is automated or semiautomated, e.g., based on image comparison between the out-of-game object and available game object assets. In another implementation, a user converts the object by creating a new game object using computer system tools. Such may then be used as a digital template, object, component, subcomponent, or the like.

In another implementation, items that have been created can be classified as unique or as repeatable. Unique items cannot be made again except by starting from the beginning of the building process. A repeatable item can be created again automatically or copy. Alternatively, items can all be treated as one or the other type.

The item tracking and attribution system as described above can manage attribution so that users can see who created an item, e.g., a specific object or the original template from which a copy was made, or the components of an item. The item tracking system can also track the use and sale of items and the contribution of components to sold items. This tracking is useful to provide benefits back to the contributors, such as points, reputation, prizes, in-game money, or real money, e.g., when items are sold for real money through an in-game marketplace. The item tracking system can be used with or as part of an implementation as disclosed in the provisional patent applications noted above.

Similarly, other variations are also possible and will be readily apparent to those of skill in the art in light of this new disclosure.

The system and method may be fully implemented in any number of computing devices. Typically, instructions are laid out on computer-readable media, generally non-transitory, and these instructions are sufficient to allow a processor in the computing device to implement the method of the invention. The computer-readable medium may be a hard drive or solid state storage having instructions that, when run, are loaded into random access memory. Inputs to the application, e.g., from the plurality of users or from any one user, may be by any number of appropriate computer input devices. For example, users may employ a keyboard, mouse, touch screen, joystick, track pad, other pointing device, or any other such computer input device to input data relevant to the calculations. Data may also be input by way of an inserted memory chip, hard drive, flash drives, flash memory, optical media, magnetic media, or any other type of file—storing medium. The outputs may be delivered to a user by way of a video graphics card or integrated graphics chipset coupled to a display that maybe seen by a user. Alternatively, a printer may be employed to output hard copies of the results. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi—connected device downloads a copy of the application to their device from a server using a wireless Internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provides separate inputs to the system and method.

One implementation includes one or more programmable processors and corresponding computer system components to store and execute computer instructions and data, such as to provide the structures, systems, and interfaces to share and control access to and spreading of the digital items, as well as to track and manage player character and non-player character actions, e.g., storing and using data for persistent acts. One such computing environment is disclosed below.

Figure 11:
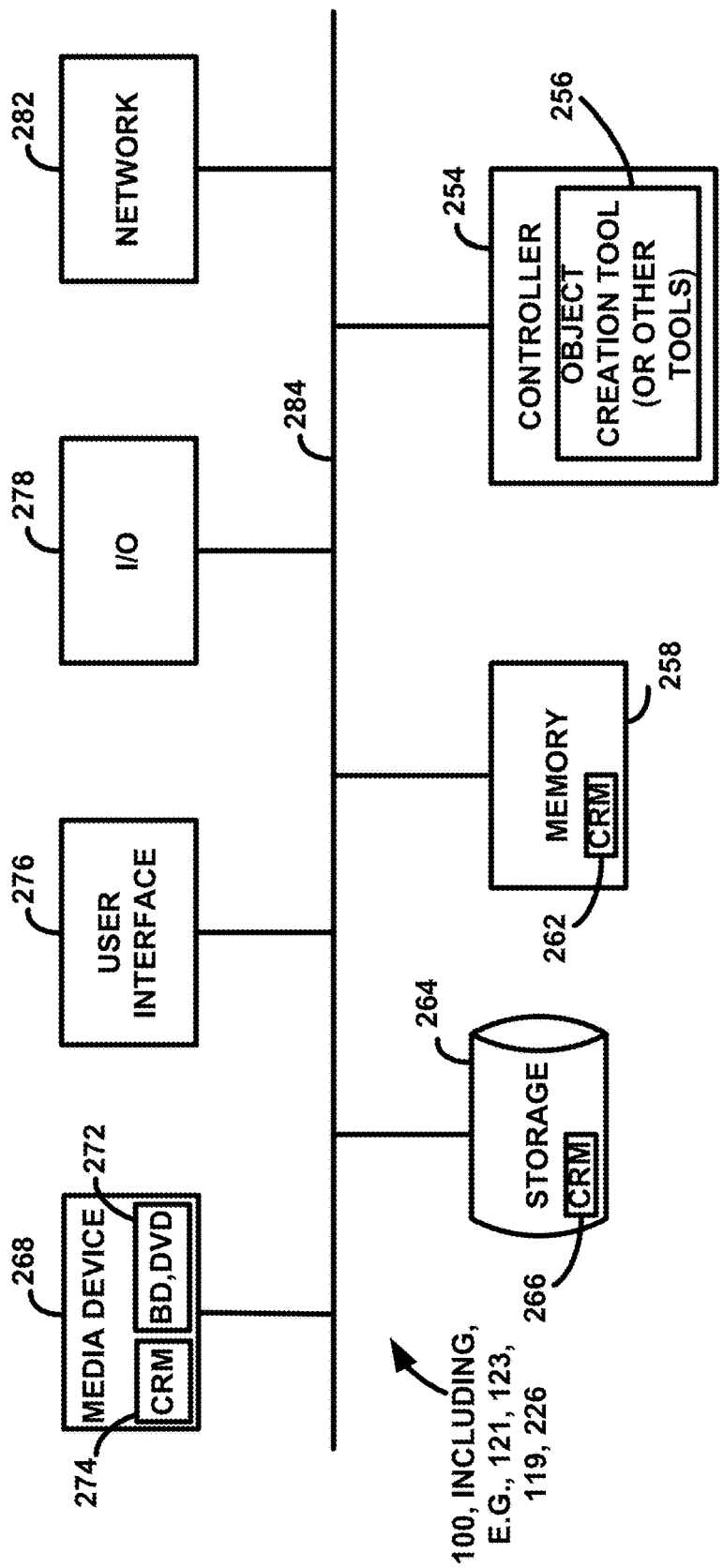
FIG. 11 is an exemplary computing environment in which the methods according to present principles may be implemented.

Referring to FIG. 11, a representation of an exemplary computing environment 100 in which the system and method may be implemented is illustrated.

The computing environment 100 includes a controller 254, a memory 258, storage 264, a media device 268, a user interface 276, an input/output (I/O) interface 278, and a network interface 282. The components are interconnected by a common bus 284. Alternatively, different connection configurations can be used, such as a star pattern with the controller at the center.

The controller 254 includes a programmable processor and controls the operation of an object creation tool 256. The controller 254 loads instructions from the memory 258 or an embedded controller memory (not shown) and executes these instructions to control the system.

Memory 258, which may include non-transitory computer-readable memory 262, stores data temporarily for use by the other components of the system. In one implementation, the memory 258 is implemented as DRAM. In other implementations, the memory 258 also includes long-term or permanent memory, such as flash memory and/or ROM.

Storage 264, which may include non-transitory computer-readable memory 266, stores data temporarily or long-term for use by other components of the system, such as for storing data or instructions. In one implementation, the storage 264 is a hard disc drive or a solid state drive.

The media device 268, which may include non-transitory computer-readable memory 274, receives removable media and reads and/or writes data to the inserted media. In one implementation, the media device 268 is an optical disc drive or disc burner, e.g., a writable Blu-ray® disc drive 272.

The user interface 276 includes components for accepting user input, e.g., the user indication of digital templates or objects or other aspects discussed above, and presenting a display, e.g., of a potential digital template or object, to the user. In one implementation, the user interface 276 includes a keyboard, a touch screen, a mouse, audio speakers, and a display. The controller 254 uses input from the user to adjust the operation of the computing environment.

The I/O interface 278 includes one or more I/O ports to connect to corresponding I/O devices, such as external storage or supplemental devices, e.g., a printer or a PDA. In one implementation, the ports of the I/O interface 278 include ports such as: USB ports, PCMCIA ports, serial ports, and/or parallel ports. In another implementation, the I/O interface 278 includes a wireless interface for wireless communication with external devices.

The network interface 282 allows connections with the local network and includes a wired and/or wireless network connection, such as an RJ-45 or Ethernet connection or "Wi-Fi" interface (802.11). Numerous other types of network connections will be understood to be possible, including WiMax, 3G or 4G/LTE, 802.15 protocols, 802.16 protocols, satellite, Bluetooth®, or the like.

The system may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

The methods shown and described above may be implemented in one or more general, multi-purpose, or single-purpose processors. Unless specifically stated, the methods described herein are not constrained to a particular order or sequence. In addition, some of the described methods or elements thereof can occur or be performed concurrently.

Functions/components described herein as being computer programs are not limited to implementation by any specific embodiments of computer programs. Rather, such functions/components are processes that convey or transform data, and may generally be implemented by, or executed in, hardware, software, firmware, or any combination thereof.

It will be appreciated that particular configurations of the operating environment may include fewer, more, or different components or functions than those described. In addition, functional components of the operating environment may be implemented by one or more devices, which are co-located or remotely-located, in a variety of ways.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be construed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

The invention claimed is:

1. A method of managing a creation process of a digital item, comprising:
    receiving an indication of a first element associated with a first source to include in a digital item associated with a game environment, wherein the indication is provided by a user to a game environment via a controller;
    receiving an indication of a second element associated with a second source to include in the digital item associated with the game environment, wherein the indication is provided by the user to the game environment via the controller; and
    executing instructions stored in memory by a processor, wherein the processor executes the instructions to:
        begin creating the digital item that includes the received first and second elements in the game environment;
        generate references for each of the received elements of the digital item being created in the game environment, wherein the generated references link information pertaining to the digital item being created,
        store information in memory pertaining to the digital item being created, wherein the stored information includes the indication of the first element, the first source, the second element, and the second source, and wherein the stored information also includes the generated references that links the stored information with the digital item being created,
        evaluate the stored information associated with the digital item being created against other information stored in the memory, wherein the evaluation includes:
            identifying similarities between the digital item being created and other created items stored in the memory,
            assigning a value associated with the identified similarities, and
            comparing the assigned value with respect to a pre-determined threshold, wherein the comparison indicates a legitimacy for the digital item being created, and
        prohibit completion of the creation of the digital item in the game environment based on the indication that the digital item being created is illegitimate.

2. The method of claim 1, wherein the digital item being created is an object within the game.

3. The method of claim 2, further comprising converting the object into a template upon receiving command from a user.

4. The method of claim 1, wherein one or more-elements associated with the digital item being created is a component, a subcomponent, or a material.

5. The method of claim 1, wherein one or more elements associated with the digital item being created is a voxel.

6. The method of claim 1, wherein the digital item being created is based on a template of an already created digital item.

7. A method of making a digital item, the method comprising:
    receiving an indication of a first element associated with a first source to include in a digital item associated with a game environment, wherein the indication is provided by a user to a game environment via a controller;
    receiving an indication of a second element associated with a second source to include in the digital item associated with the game environment, wherein the indication is provided by the user to the game environment via the controller;
    receiving an indication of a skill and a third source associated with the skill to include in the digital item, wherein creation of the digital item includes using the skill; and
    executing instructions stored in memory by a processor, wherein the processor executes instructions to:
        begin creating the digital item that includes the received first and second elements in the game environment,
        generate references for each of the received elements of the digital item being created in the game environment, wherein the generated references link information pertaining to the digital item being created,
        generate a reference for the received skill and the third source, wherein the generated reference links the received skill and the third source to the digital item being created,
        store information in memory pertaining to the digital item being created, wherein the stored information includes the indication of the first element, the first source, the second element, the second source, the indicated skill and the third source of the skill, and wherein the stored information also includes the generated reference that links the stored information with the digital item being created, and
        evaluate the stored information associated with the digital item being created against other information stored in the memory, wherein the evaluation includes:
            identifying similarities between the digital item being created and other created items stored in the memory,
            assigning a value associated with the identified similarities, and
            comparing the assigned value with respect to a pre-determined threshold, wherein the comparison indicates a legitimacy for the digital item being created.

8. The method of claim 7, wherein the skill operates on one or more of the elements associated with the digital item being created.

9. The method of claim 7, wherein the skill operates to join the first and second elements.

10. The method of claim 7, wherein the skill operates to join one of the elements into the digital item being created.

11. The method of claim 7, wherein one of the elements is a material, and wherein the skill operates to transform the one element into a component or subcomponent.

12. The method of claim 7, wherein the stored information associated with the created digital item being created further includes a value of the one or more elements used in the digital item being created upon creation.

13. The method of claim 12, further comprising a transaction that includes the completed digital item and that causes a benefit to be transmitted to one or more sources associated with the created digital item based on the stored values of the one or more elements associated with the one or more sources used in the created digital item.

14. The method of claim 7, further comprising receiving a definition of a geographic extent within the online environment, wherein the geographic extent defining a location for the item, and wherein both the first and second elements are placed within the geographic extent.

15. The method of claim 14, further comprising:
receiving an indication from a user of a set of elements within the geographic extent, and
executing instructions stored in memory by a processor, the processor executing the instructions to:
generate a second set of references from the set of indicated elements, wherein the second set of references are linked to the digital item being created, and
store the received set of elements within the geographic extent into memory along with the generated second set of references.

16. The method of claim 7, wherein the skill operates on both the first and second element.

17. A non-transitory computer-readable medium, comprising instructions for causing a computing environment to perform the method of managing a creation process of a digital item, the method comprising:
receiving an indication of a first element associated with a first source to include in a digital item associated with a game environment, wherein the indication is provided by a user to the game environment via a controller;
receiving an indication of a second element associated with a second source to include in the digital item associated with the game environment, wherein the indication is provided by the user to the game environment via the controller; and
executing instructions stored in memory by a processor, wherein the processor executes the instructions to:
begin creating the digital item that includes the received first and second elements in the game environment;
generate references for each of the received elements of the digital item being created in the game environment, wherein the generated references link information pertaining to the digital item being created,
store information in memory pertaining to the digital item being created in the game environment, wherein the stored information includes the indication of the first element, the first source, the second element, and the second source, and wherein the stored information also includes the generated references that links the stored information with the digital item being created,
evaluate the stored information associated with the digital item being created against other information stored in the memory, wherein the evaluation includes:
identifying similarities between the digital item being created and other created digital items stored in the memory,
assigning a value associated with the identified similarities, and
comparing the assigned value with respect to a pre-determined threshold, wherein the comparison indicates a legitimacy for the digital item being created, and
prohibit a completion of the creation of the digital item in the game environment based on the indication that the item being created is illegitimate.

18. A digital item, stored on a non-transitory computer readable medium, made by the method of managing a creation process of a digital item, the method comprising:
receiving an indication of a first element associated with a first source to include in a digital item associated with a game environment, wherein the indication is provided by a user to a game environment via a controller;
receiving an indication of a second element associated with a second source to include in the digital item associated with the game environment, wherein the indication is provided by the user to the game environment via the controller; and
executing instructions stored in memory by a processor, wherein the processor executes the instructions to:
begin creating the digital item that includes the received first and second elements in the game environment;
generate references for each of the received elements of the digital item being created in the game environment, wherein the generated references link information pertaining to the digital item being created,
store information in memory pertaining to the created digital item being created, wherein the stored information includes the indication of the first element, the first source, the second element, and the second source, and wherein the stored information also includes the generated references that links the stored information with the digital item being created,
evaluate the stored information associated with the digital item being created against other information stored in the memory, wherein the evaluation includes:
identifying similarities between the digital item being created and other created digital items stored in the memory,
assigning a value associated with the identified similarities, and
comparing the assigned value with respect to a pre-determined threshold, wherein the comparison indicates a legitimacy for the digital item being created, and
allowing completion of the creation of the digital item in the game environment based on the indication that the digital item being created is legitimate.

19. A method of managing a creation process of a digital item, comprising:
receiving an indication of a first element from a first source to include in a digital item associated with a game environment, wherein the indication is provided by a user to the game environment via a controller;
receiving an indication of a second element from a second source to include in the digital item associated with the game environment, wherein the indication is provided by the user to the game environment via the controller; and
executing instructions stored in memory by a processor, wherein the processor executes the instructions to:
begin creating a digital item including the first and second elements in the game environment, wherein the creating is triggered by a received action from the first source and the second source by the user via the controller;
generate references for each of the received elements of the digital item being created in the game environment, wherein the generated references link information pertaining to the digital item being created,
store information in memory pertaining to the digital item being created, wherein the stored information includes the indication of the first element, the first source, the second element, and the second source, and wherein the stored information also includes the generated references that links the stored information with the digital item being created, evaluate the stored information associated with the digital item being created against other information stored in the memory, wherein the evaluation includes:
  identifying similarities between the digital item being created and other created digital items stored in the memory,
  assigning a value associated with the identified similarities, and
  comparing the assigned value with respect to a pre-determined threshold, wherein the comparison indicates a legitimacy for the digital item being created, and
allowing completion of the creation of the digital item in the game environment based on the indication that the item being created is legitimate.

20. The method of claim 19, wherein the first and second sources are characters in an online game.

21. The method of claim 20, wherein the characters are controlled by users.

22. The method of claim 19, further comprising receiving a definition of a geographic extent within the online environment, wherein the geographic extent defining a location for the item, and wherein both the first and second elements are placed within the geographic extent.

23. The method of claim 20, wherein the characters are controlled by AI.

24. The method of claim 20, wherein the characters are controlled by users and AI.

25. The method of claim 19, wherein upon a transaction including the created digital time causes a benefit to be transmitted to one or more sources associated with the created digital item.

26. The method of claim 19, wherein the first and second actions are selected from the group consisting of: deploying or operating on a voxel, a component, a subcomponent, or a material, or performing a skill.

27. A non-transitory computer-readable medium, comprising instructions for causing a computer environment to perform the method of managing a creation process of a digital item, the method comprising:
  receiving an indication of a first element from a first source to include in a digital item associated with a game environment, wherein the indication is provided by a user to a game environment via a controller;
  receiving an indication of a second element from a second source to include in the digital item associated with the game environment, wherein the indication is provided by the user to the game environment via the controller;
  beginning creation of a digital item including the first and second elements in the game environment, wherein the creating is triggered by a received action from the first source and the second source;
  generating references for each of the received elements of the digital item being created in the game environment, wherein the generated references link information pertaining to the digital item being created,
  storing information in memory pertaining to the digital item being created, wherein the stored information includes the indication of the first element, the first source, the second element, and the second source, and wherein the stored information also includes the generated references that links the stored information with the digital item being created;
  evaluating the stored information associated with the digital item being created against other information stored in the memory, wherein the evaluation includes:
    identifying similarities between the digital item being created and other created digital items stored in the memory,
    assigning a value associated with the identified similarities, and
    comparing the assigned value with respect to a pre-determined threshold, wherein the comparison indicates a legitimacy for the digital item being created; and
  prohibiting completion of creation of the digital item based in the game environment on the indication that the item being created is illegitimate.

* * * * *